M. GERARDY.
SPARK COLLECTOR AND DISTRIBUTER.
APPLICATION FILED JULY 27, 1912.
1,087,651.
Patented Feb. 17, 1914.
3 SHEETS—SHEET 1.
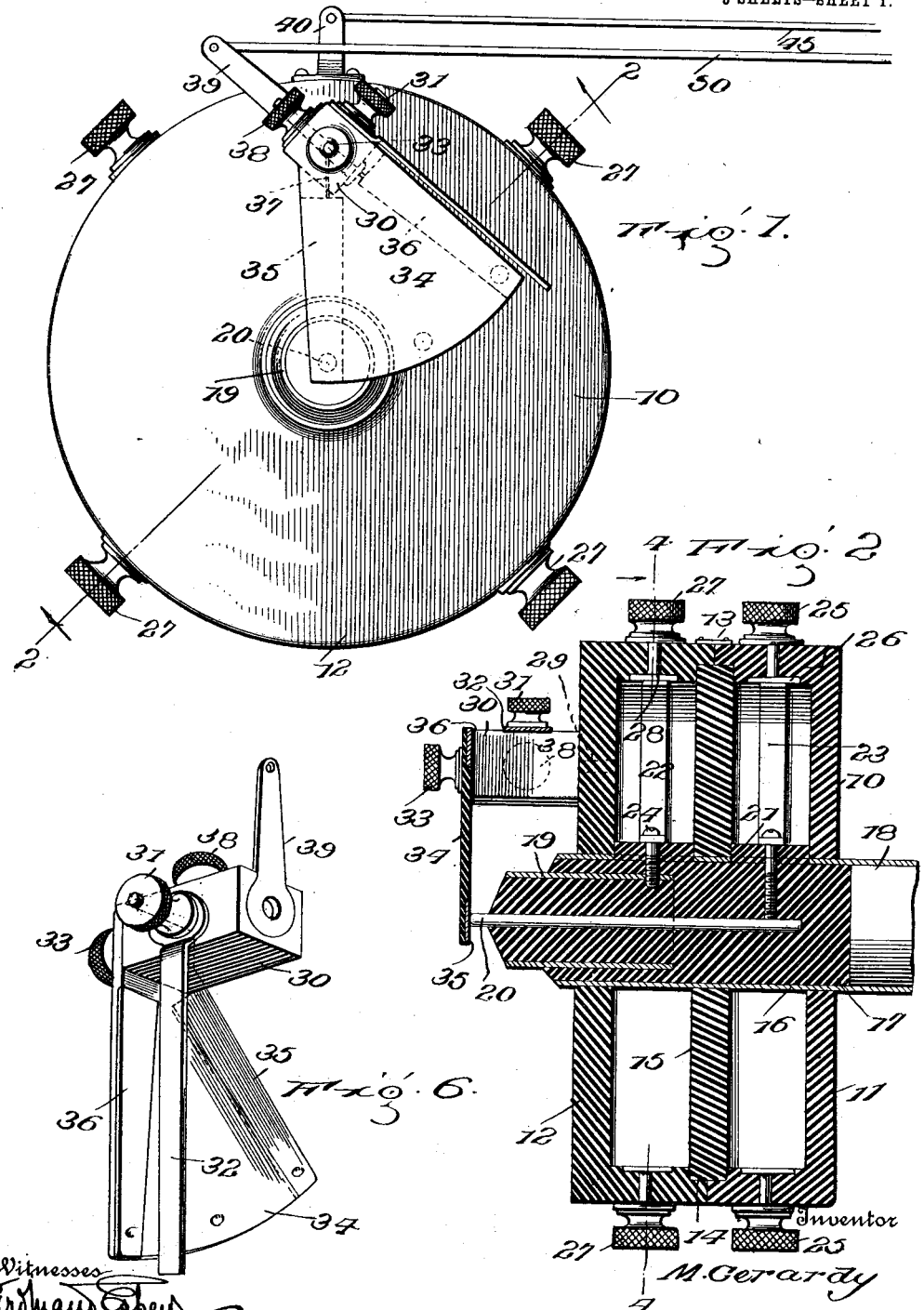

M. GERARDY.
SPARK COLLECTOR AND DISTRIBUTER.
APPLICATION FILED JULY 27, 1912.
1,087,651.   Patented Feb. 17, 1914.
3 SHEETS—SHEET 2.
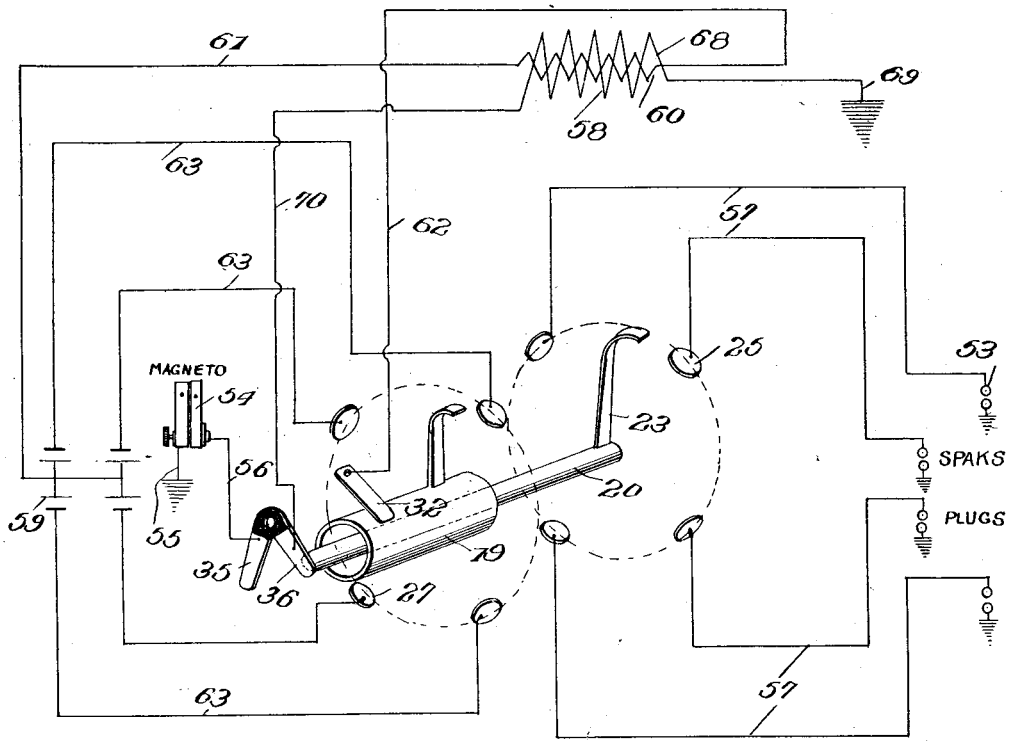
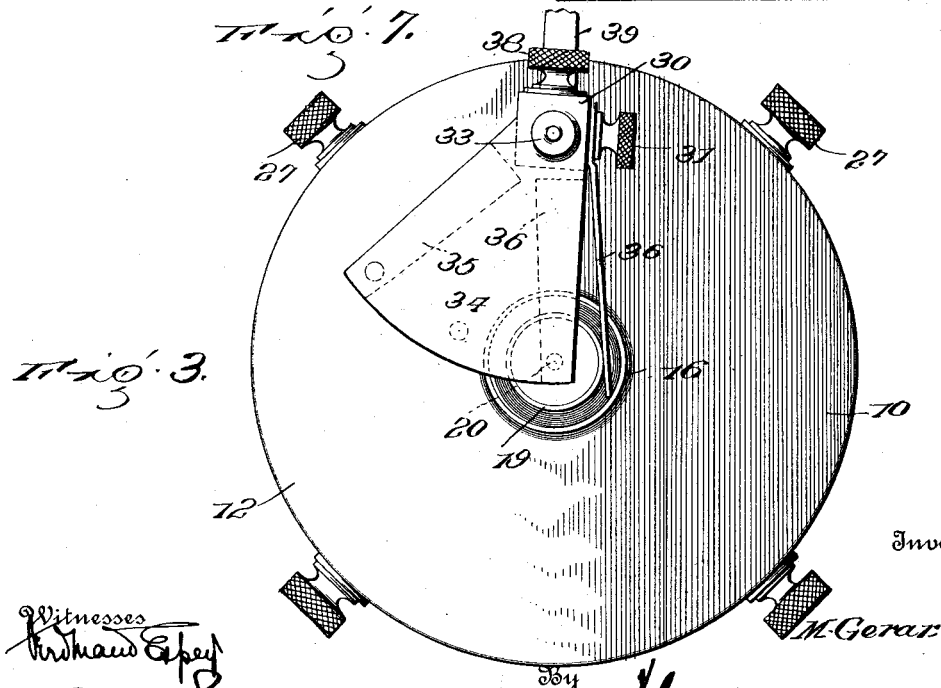

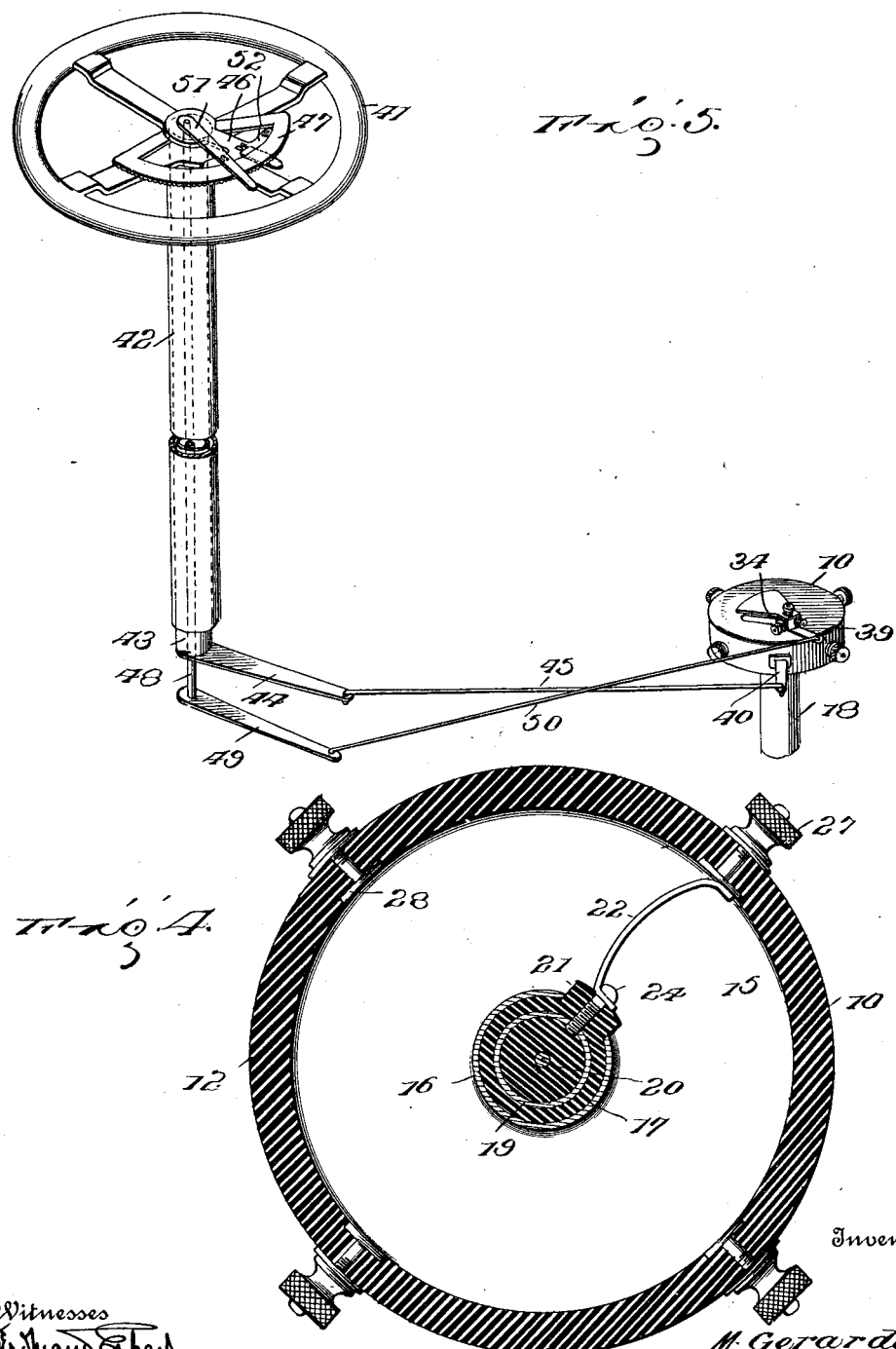

UNITED STATES PATENT OFFICE.

MICHAEL GERARDY, OF WATHENA, KANSAS.

SPARK COLLECTOR AND DISTRIBUTER.

1,087,651. Specification of Letters Patent. Patented Feb. 17, 1914.

Application filed July 27, 1912. Serial No. 711,887.

*To all whom it may concern:*

Be it known that I, MICHAEL GERARDY, citizen of the United States, residing at Wathena, in the county of Doniphan and State of Kansas, have invented certain new and useful Improvements in Spark Collectors and Distributers, of which the following is a specification.

My invention relates to new and useful improvements in ignition systems for explosive engines and more particularly for automobile engines, and the object of my invention is to provide an improved timer and distributer for regulating the passage of the current from either the batteries or magneto to the spark plugs of the engine, and thereby govern the explosions of the various cylinders thereof.

A further object of my invention is to provide a timer and distributer which will receive the current from a magneto and distribute the same to the various cylinders of the engine and which may also be used with batteries, being adapted to receive the current from one or more batteries and pass the same through a single induction coil and to then receive the current from the secondary winding of the induction coil and distribute it to the various spark plugs of the engine.

A further object of my invention is to so construct the timer and so wire the ignition system that the system may be wired for both batteries and magneto and may be readily changed from one to the other or cutoff from both by the swinging of a single movable switch member carrying a plurality of switch blades.

A further object of my invention is to provide means for governing the timer and distributer wholly from the steering wheel of the vehicle, the timer being swung to advance or retard the spark by one lever carried by the steering wheel and the switch member being swung to change from batteries to magneto or magneto to batteries or from either one to neutral by a second lever also carried by the steering wheel. And a still further object of my invention is to so mount these levers on the steering wheel that the swinging of the spark lever will also swing the switch lever, thereby permitting the advancing or retarding of the spark by the single movement of one lever without any danger of such movement changing the ignition from battery to magneto or the reverse.

With these and other objects in view, my invention will be more fully described, illustrated in the accompanying drawings, and then specifically pointed out in the claims which are attached to and form a part of this application.

In the drawings: Figure 1 is a front elevation of my improved timer and distributer, showing the switch blade carrying member; Fig. 2 is a central section on the line 2—2 of Fig. 1, showing the internal construction of the distributer and also more clearly bringing out certain points in the construction of the switch carrying member and the blades mounted thereon; Fig. 3 is a view similar to that shown in Fig. 1, but with the switch carrying member in reversed position, the switch carrying member in Fig. 1 being shown in the position occupied when the engines are running on the magneto, while in Fig. 3, said member occupies the reverse position for running the engine on the batteries; Fig. 4 is a section on the line 4—4 of Fig. 2, showing further details of construction of the timer and distributer proper; Fig. 5 is a fragmentary perspective view, showing one manner of operatively connecting both the timer and its switch carrying member with control levers mounted upon the steering wheel of the vehicle; Fig. 6 is a perspective view of the switch carrying member and the switch blades mounted thereon, said member being shown detached from the timer and distributer; Fig. 7 is a diagrammatic view, showing the wiring of the ignition system and clearly explaining the manner in which my improved timer and distributer is employed.

Corresponding and like parts are referred to in the following description and indicated in all the views of the drawings by the same reference characters.

The preferred embodiment of my timer and distributer includes a casing designated as whole by the numeral 10 and formed of any suitable insulating material such as vulcanized rubber. This casing is preferably formed of two symmetrical parts 11 and 12 which, when joined together by suitable hooks or other fastening devices 13, form a hollow cylindrical casing. The free edges of the casing members 11 and 12 are grooved on their inner faces as shown at 14 and the grooves of these members co-act to form a seat for a transversely extending, centrally positioned partition wall 15 also formed of insulating material. This wall not only divides the casing into two portions or chambers but, because of the manner in which it is seated in the grooves, serves to prevent all independent movement of the members 11 and 12 when fastened together. The casing may, if desired, be inclosed in an outer casing of metal, although this is not at all necessary.

The casing 10 above described is mounted for rotation upon a sleeve 16 preferably formed of metal and inclosing a cylindrical core of insulating material and one end of this sleeve extends rearwardly through the wall of the body member 11 and is mounted upon the free end of the cam shaft 18 of the engine or, if preferred, upon any suitably timed shaft driven by the engine. The opposite end of the sleeve extends a slight distance in advance of the front wall of the casing and the insulated core extends a considerable distance in advance of its sleeve, as shown. This core, at its forward end, is provided with an annular recess for the reception of a second metallic sleeve 19, the outer end of which extends beyond the outer end of the sleeve 16 to provide a contact for one of the switch blades as will be hereinafter explained. The core 17 is also provided throughout a portion of its length with a centrally formed bore in which is seated a metallic rod or core 20, the outer end of which extends beyond the end of the core to form a second contact for another switch blade.

The sleeve 16 is provided with openings which, when the casing is in place, communicate one with each of the chambers formed by the partition walls 15. Secured to the core, through each of these openings, is a block of insulating material 21 and mounted upon these blocks are the spring brushes 22 and 23, the blocks of insulating material and brushes being secured in place by screws 24, one of which extends through the inner end of the sleeve 19 forming electrical connection between said sleeve and the brush 22 and the other of which extends through the inner end of the metallic core 20 forming electrical connection between it and the brush 23. The blocks 21, extending as they do beyond the outer face of the sleeve, serve as stops to prevent all longitudinal movement of the sleeve and core through the casing.

The brushes shown in the drawings are of the leaf spring type, but it will be understood that spring pressed balls or rollers or any suitable form of brush may be employed in their place. These brushes are so proportioned that their free ends bear against the inner face of the casing, as shown.

The member 11 of the casing is provided about its circumference with a plurality of equally spaced apart binding posts 25, the stems of which extend through the wall of said member and terminate in contact heads 26 which seat in sockets formed in the inner face of the casing member 11 and in position to be engaged by the brush 23. As many of these binding posts are provided as the engine has cylinders, as these binding posts form the distributer posts through which the current is transmitted to the engine cylinders. The drawings illustrate a timer and distributer for use with a four-cylinder engine and four of these posts are therefore shown. The body member 12 of the casing is provided in a like manner with an equal number of similarly arranged binding posts 27, the contact heads 28 of which are in position to be engaged by the brush 22, the binding posts of the two members being so arranged that adjacent binding posts will be simultaneously in contact with the brushes 22 and 23.

A pivot pin 29 extends through the casing member 12 and mounted for rotation upon the outer end of this pin, is a switch carrying member 30, preferably in the form of a rectangular shaped block of insulating material. Secured to one of the sides faces of this block by means of a binding post 31, is a spring switch blade 32 which, in one position of the switch carrying member, bears by its free end adjacent the outer face of the exposed portion of the sleeve 19. Secured in like manner by a binding post 33 upon the outer end of the member 30, is a double switch member, indicated as a whole by the numeral 34. This member includes a fan shaped insulated body provided along its side edges with contact plates 35 and 36 which are preferably seated in recesses formed in the inner face of the body 34, as shown in Fig. 2, to lie flush with the inner face of the body 34. The contact plate 35 is electrically connected as shown at 37 with the binding post 33, while the contact plate 36 is similarly connected with a binding post 38 also mounted upon the switch carrying member 30, all of the binding posts 31, 33 and 38 being insulated from each other. This switch carrying member 30 is so proportioned that the fan shaped switch member 34 bears by its inner face against the free end of the metallic core 20 in such a manner that either of the contact plates 35 or 36 may be swung into engagement with said core and therefore into electrical connection with the brush 23. The inner end of the switch carrying member 30 is recessed to receive one end of a lever arm 39, the free end of which extends beyond the periphery of the casing 10 to provide a means for swinging the switch carrying member to bring either the plate 35 or the plate 36 into engagement with the core 20. When the fan shaped switch member 34 occupies an intermediate position, it will be apparent that neither of the plates will engage with the core 20 and all circuits will be open.

Secured to the peripheral face of the casing 10 and in radial alinement with the switch carrying member 30, is a second lever arm 40 by means of which the casing 10 may be swung about its shaft to advance or retard the spark in a manner which will be more fully described hereafter. In order to more fully explain the manner in which the the spark is advanced and retarded and the switch carrying member swung by means of levers carried by the steering wheel of the vehicle, reference will be had to Fig. 5 of the drawings in which 41 designates a conventional form of steering wheel mounted upon the upper end of a hollow steering post 42 of common type. Extending through this steering post, is a sleeve 43 provided at its lower end with a laterally directed lever arm 44, the free end of which is operatively connected with the free end of the lever 40 by a connecting rod 45.

Secured upon the upper end of this sleeve 43, is a hand lever 46 which co-acts with a toothed sector 47 mounted upon the steering wheel. Extending through the sleeve 43, is a rod 48, the lower end of which is provided with a lever arm 49 which is connected by a rod 50 with the lever arm 39 of the switch carrying member. Secured upon the upper end of this rod 48, is a hand lever 51 by means of which the rod 48 may be turned to swing the switch carrying member and consequently the switch member 34 from one position to another. The hand lever 46, as shown, is provided with lateral extensions intermediate its length forming a rack segment 52 for locking the lever 51 in adjusted position, the teeth on said segment being so arranged as to lock the lever 51 only when the switch member 34 is in neutral position and when one of its contacts 35 or 36 is in engagement with the core 20 of the distributer. Because of this peculiar arrangement of controlling levers, it will be apparent that the lever 46 may be, at any time, swung to advance or retard the spark and that the lever 51 will move with it without, in any way, affecting or changing the position of the switch carrying member, although the timer, as a whole, is turned upon its shaft.

Having thus described the timer and distributer, I will now describe the manner in which it operates, including the wiring of one form of ignition system for use with this particular distributer.

Referring more specifically to Fig. 7 of the drawings, 53 designates the spark plugs of the engine cylinders, all of which are grounded, as shown. A magneto, diagrammatically shown at 54, is mounted in the usual manner upon any suitable shaft driven by the engine, is grounded as shown at 55, and is connected by a conductor wire 56 with the binding post 33 of the timer. A plurality of conductor wires 57 connect the binding posts 25 with the spark plugs 53. It will therefore be apparent that when the switch carrying member is swung to bring the contact plate 35 into engagement with the core 20, the current generated in the magneto will flow through the wire 56, the contact plate 35, core 20 and brush 23 by means of which it will be distributed from the various binding posts 25 through the conductor wires 57 to the spark plugs and hence to the ground, the circuit therefore being complete.

It will of course be understood that the timer and distributer is so mounted upon the time shaft by which it is driven as to bring the brush 23 into contact with each binding post 25 at the time when the ignition is desired in that particular engine cylinder, the spark plug of which is connected with said binding post.

In order to adapt the system for use with batteries I have provided an induction coil, designated as a whole by the numeral 58 and the positive poles of the batteries 59 are connected with the primary winding 60 by a conductor wire 61, while the other terminal of the primary winding is connected by a conductor wire 62 with the binding post 31 of the spring switch blade 32. The negative poles of the batteries are connected by a plurality of wires 63 with the binding posts 27. One terminal of the secondary winding 68 of the induction coil is grounded as shown at 69 and its other terminal is connected by a wire 70 with the binding post 38 of the contact plate 36.

Any suitable number of batteries may be employed, but preferably as many batteries as there are cylinders in the engine are used and when this is the case, each battery is connected directly to one of the binding posts 27. In case a single battery is employed, diametrically disposed binding posts 27 are electrically connected and one pair of adjacent binding posts are electrically connected and the battery is connected directly to any one of the four binding posts. In case two batteries are employed, diametrically disposed binding posts 27 are electrically connected with each other and each battery is connected directly to one of the binding posts of one of the connected pairs.

When the engine is to be run on the batteries, the switch carrying member 30 is swung to bring the switch blade 32 into engagement with the sleeve 19 and the contact plate 36 into engagement with the core 20.

The current will then flow from the positive poles of the batteries through the wire 61, primary winding of the induction coil, wire 62 to the switch blade 32, through the sleeve 19 to the brush 22 by means of which it is distributed to the contact terminals of the binding posts 27 from which it is conducted by the wires 63 to the negative poles of the batteries, thus completing the primary circuit. The current generated in the secondary winding of the coil flows through the conductor wire 70 to the contact plate 36, through the core 20 to the brush 23 and is distributed by the brush 23 to the contact terminals of the binding posts 25, passing from said binding posts through the wires 57 to the spark plugs 53 and so to the ground.

From the foregoing description, taken in connection with the drawings, the operation of my improved ignition system and of the timer and distributer employed therein will be readily understood and no description of the same is necessary.

It will of course be known that I do not wish in any way to limit myself to the specific details of construction above described and illustrated in the drawings as various changes, not affecting the manner of operation of the system, may be made without in the slightest degree departing from the spirit of my invention.

Having thus described the invention, what is claimed as new is:

1. A distributer and timer including an insulating casing, an insulated shaft extending into and rotatable in said casing, a conductor sleeve carried by the free end of the shaft and extending beyond the casing, a conductor core carried by the shaft and extending beyond the sleeve, a plurality of contacts carried by the casing, a brush carried by the sleeve and co-acting with said contacts, a plurality of additional contacts carried by the casing, and a second brush carried by the core and co-acting with the last named contacts.

2. A distributer and timer including an insulating casing, an insulated shaft rotatable in said casing, a conductor sleeve carried by the shaft and extending beyond the casing, a conductor core carried by the shaft and extending beyond the sleeve, a plurality of contacts carried by the casing, a brush carried by the sleeve and co-acting with said contacts, a plurality of additional contacts carried by the casing, a second brush carried by the core and co-acting with the last named contacts, and a movable switch carrying member mounted upon the casing and having switch blades adapted for engagement with the sleeve and core.

3. A distributer and timer including an insulating casing, an insulated shaft rotatable in said casing, a conductor sleeve carried by the shaft and extending beyond the casing, a conductor core carried by the shaft and extending beyond the sleeve, a plurality of contacts carried by the casing, a brush carried by the sleeve and co-acting with said contacts, a plurality of additional contacts carried by the casing, a second brush carried by the core and co-acting with the last named contacts, and a movable switch carrying member mounted upon the casing and having switch blades adapted for engagement with the sleeve and core, one of said blades being mounted for engagement with the sleeve, while the other of said blades are mounted for selective engagement with the core.

4. A distributer and timer including a casing, a sleeve and a core mounted for rotation within the casing and extending by one end beyond the same, said sleeve and core being adapted to rotate simultaneously and being insulated from each other and from the casing, a brush carried by the sleeve, contacts carried by the casing and co-acting with said brush, a second brush carried by the core, additional contacts carried by the casing and co-acting with said second brush, a switch blade carrying member mounted upon the casing and movable to bring its various blades into active position, a fan shaped switch blade carried by said member and engaging against the end of the core, said blade being provided with spaced contact plates insulated from each other, and a switch blade carried by the blade carrying member and adapted to engage against the sleeve when one of the contact plates engages the core and to be spaced from the sleeve when the other contact plate engages the core.

5. A distributer and timer including a two-part casing of insulating material, a partition wall dividing said casing transversely, a sleeve rotatable in said casing and adapted to be mounted upon a shaft, said sleeve being filled with a core of insulating material, a conductive core positioned within the insulating core, a second sleeve seated in one end of said insulating core and spaced from the conductive core and from the first mentioned sleeve, a plurality of contacts carried by the casing, a brush carried by the conductive core and co-acting with said contacts, a plurality of additional contacts carried by the casing, a brush carried by the second named sleeve and co-acting with said additional contacts, all of said contacts including binding posts, a block of insulating material mounted for swinging movement upon the casing, a fan shaped member mounted upon said block, spaced contact plates carried by said member and arranged for selective engagement against the conductive core as the switch carrying member is moved, a switch blade carried by said switch carrying member and adapted for engagement against the sleeve when a certain one of said plates is in engagement with the core, and means for swinging said switch carrying member.

6. A distributer and timer including an insulating casing, a plurality of contacts carried by said casing, a shaft rotatable in the casing, brushes carried by the shaft and insulated therefrom and co-acting with the contacts, conductors carried by the shaft and electrically connected to said brushes, a switch bearing member mounted for swinging movement upon the casing and having switch blades adapted for simultaneous engagement with the conductors which are electrically connected with the brushes and an additional switch blade adapted for engagement with one of said conductors, means for turning the casing about the shaft, and means for swinging said switch carrying member.

7. A distributer and timer including an insulating casing, a plurality of contacts carried by said casing, a shaft rotatable in the casing, brushes carried by the shaft and insulated therefrom and co-acting with the contacts, conductors carried by the shaft and electrically connected to said brushes, a switch bearing member mounted for swinging movement upon the casing and having switch blades adapted for simultaneous engagement with the conductors which are electrically connected with the brushes and an additional switch blade adapted for engagement with one of said conductors, means for turning the casing about the shaft, and means for swinging the switch bearing member, said means being so arranged that the casing may be swung without changing the position of the switch bearing member with respect to its contacts.

8. In an ignition system, the combination with a timer and distributer having a plurality of secondary distributer contacts, of a brush co-acting with said contacts, a plurality of primary distributer contacts, a brush co-acting with said latter contacts, switch blades movable simultaneously into electrical connection with said brushes, an additional switch blade movable into electrical connection with one of said brushes when the first mentioned switch blades are moved to inactive position, a plurality of grounded spark plugs, wires connecting said spark plugs with the secondary distributer contacts, a plurality of batteries, wires connecting the negative poles of said batteries with the primary distributer contacts, an induction coil having a primary and a secondary winding, a wire connecting the positive poles of the batteries with the primary winding, a wire connecting the primary winding with one of the first mentioned switch blades, a wire grounding the secondary winding, a wire connecting the secondary winding with the other of said first mentioned switch blades, a grounded magneto, and a wire connecting said magneto with the third switch blade.

9. An ignition system for explosive engines including a timer and distributer having secondary distributing contacts and primary distributing contacts, a brush for the secondary contacts, a brush for the primary contacts, a pair of alternate switch blades movable in and out of electrical connection with the secondary brush, a switch blade movable simultaneously with the first mentioned switch blades into and out of electrical connection with the primary brush, a plurality of batteries, an induction coil having a primary winding and a secondary winding, one terminal of which is grounded, a wire connecting the positive poles of the battery with one terminal of the primary winding, a wire connecting the other terminal of the primary winding with that switch blade adapted for connection with the primary brush, wires connecting the primary distributer contacts with the free poles of the batteries, a wire connecting the free terminal of the secondary winding with one of the switch blades and adapted for electrical connection with the secondary brush, a magneto, a wire connecting the magneto with the remaining switch blade, a plurality of spark plugs, and wires connecting the secondary contacts with the spark plugs, said spark plugs and magneto being grounded.

In testimony whereof I affix my signature in presence of two witnesses.

MICHAEL GERARDY. [L. S.]

Witnesses:
E. J. SCHOLZ,
GEO. MANVILLE.

---

Copies of this patent may be obtained for five cents each, by addressing the "Commissioner of Patents, Washington, D. C."